United States Patent
Campbell

[15] 3,679,176
[45] July 25, 1972

[54] BELT TIGHTENING TOOL

[72] Inventor: William W. Campbell, 271 Claywell Drive, San Antonio, Tex. 78209

[22] Filed: Nov. 23, 1970

[21] Appl. No.: 91,771

[52] U.S. Cl..................................254/54, 254/100, 254/126
[51] Int. Cl..........................................F16g 11/12, B66f 3/36
[58] Field of Search ............................254/52, 54, 100, 126

[56] References Cited

UNITED STATES PATENTS

| | | | |
|---|---|---|---|
| 2,492,853 | 12/1949 | Flynn | 254/126 |
| 3,325,095 | 6/1967 | Mueller | 254/100 |

*Primary Examiner*—Andrew R. Juhasz
*Assistant Examiner*—David R. Melton
*Attorney*—Donald R. Comuzzi

[57] ABSTRACT

A belt tightening tool for adjusting the tension in the belt of a belt and pulley drive assembly having an adjustably mounted pulley consisting of a pair of pulley saddles for bearing against the grooves of opposite pulleys of the drive assembly. A screw bar adjusting assembly is operatively connected through pivotally connected connecting links to the pulley saddles for expanding and contracting the interval between the pulley saddles relative to each other along a common axis and for locking the pulley saddles in position relative to each other along the common axis.

1 Claim, 2 Drawing Figures

PATENTED JUL 25 1972 3,679,176

INVENTOR:
WILLIAM W. CAMPBELL

ATTORNEY
Donald R. Comuzzi

BELT TIGHTENING TOOL

BACKGROUND OF THE INVENTION

This invention relates to a tool for use in adjusting the tension of an endless drive belt such as the V-belts on automobile cooling fans, A-C compressors, power steering pumps, generators, air conditioners and the like.

More specifically, the invention relates to a tool which will engage two pulleys of a belt and pulley drive and which can be easily operated to force an adjustably mounted pulley apart from the other pulley and thereby tighten the belt by increasing the tension in the belt. This type of belt and pulley drive having one adjustably mounted pulley is common to most automotive vehicles, such drives being taken off the crankshaft of the engine of vehicle for driving the fan of the engine, a generator for the electrical system, power steering, air conditioner, etc. It is very important that the tension of the belts in such belt drive assemblies be periodically adjusted to maintain proper tension in the belt in order to reduce belt wear and thereby increase belt life and insure proper operation of the drive assembly.

It is a primary object of this invention to provide a tool which can be used to adjust the tension in the belt of a belt drive assembly which tool is easy to use and which can be inserted and operated from a position which is easily accessible to the user.

A tension gauge of any well-known type may be mounted on the belt for reading the tension in the belt during the tightening operation.

This invention overcomes many of the problems encountered in prior methods used to tension a belt of a belt-pulley drive. One common method which has been used involved loosening the bolts of the adjustably mounted pulley and then employ a pry bar to force the adjustably-mounted pulley apart from the other pulley to obtain the desired belt tension. If a gauge is used in this type of operation to determine the correct tension, the gauge must first be released from the belt, since the static friction of the belt on the gauge affects the reading, and then the gauge is reapplied to obtain the correct tension. During the gauging of the tension, constant pressure must be maintained on the pry bar. Of course, it is very difficult to maintain a constant pressure with such a prying device and therefore the operation must be repeated several times in order to obtain the correct tension. After the correct tension is obtained, it is necessary to tighten the bolts on the adjustably mounted pulley while at the same time maintaining constant pressure on the pry bar, which requires the use of both hands and which at its very best is a very difficult and time-consuming task. The job is made even more difficult when the bolts have nuts threaded thereon which must be held against turning by a wrench.

To overcome the obvious disadvantages of the aforementioned method of belt tightening, attempts have been made to devise a tool which can be used to achieve the desired results but with less effort. One known type of tool is disclosed in U.S. Pat. No. 3,325,095 issued to Mueller et al. The tool disclosed in this patent does enable the user to position the tool between two pulleys of a belt and pulley drive assembly and by manipulation of a screw mechanism located on the tool and between the pulleys, force an adjustable pulley apart from a stationary pulley and thereby increase the tension in the belt. This invention has several disadvantages however which the present invention will overcome. One of the disadvantages of the Mueller, et al tool is its inability to be used between pulleys which are positioned very close together as is the case on many vehicles employing a belt pulley drive assembly. A further disadvantage of this particular tool is its lack of adaptability for use over a wide range of belt pulley assemblies with widely varying spacing between the pulleys. For example, the minimum space between which the tool can be inserted is determined by the length of the tool from tip to tip and the maximum is less than twice this minimum length. Still another disadvantage of the tool disclosed in the Mueller et al patent is the inaccessibility of the operative portion of the tool to the user. As can be seen, the tool must be inserted into the belt pulley assembly, which in most automotive vehicles is quite inaccessible, by reaching one's hand into the assembly area and the user must attempt to adjust the tool by reaching down into this very inaccessible space and turning the adjusting mechanism either by hand or by attempting to manipulate a wrench to engage and turn the adjusting mechanism.

SUMMARY OF THE INVENTION

This invention relates to a tool for tightening the belt in a belt pulley drive assembly which will overcome the disadvantages of the prior method of using a pry bar to engage the adjustable pulley and while maintaining pressure on the bar with one hand, attempt to tighten the bolts on the adjustable pulley with the other hand. This invention also overcomes the disadvantages of other known belt tools by providing a tool which can be easily inserted into the belt-pulley assembly for engagement with opposing pulleys of the assembly and which can be operated from an accessible vantage point outside the assembly area. Furthermore, this invention provides a belt tensioning tool which will accommodate a wide range of spacing between pulleys from a minimum of less than two inches between pulleys to a maximum of more than twelve inches without the use of extenders or other accessories.

The tool of the present invention consists of a tool T having a pair of opposing pulley engaging saddles mounted thereon and assembled for expanding and contracting the interval relative to each other along a common axis with means for effecting said contraction and expansion and for locking said saddles in position relative to each other along said common axis. The means for effecting the relative movement of said saddles consists of a threaded screw bar mounted in perpendicular alignment to the common axis between the opposing pulley saddles. The threaded screw bar is provided with a nut or bolt head such as a hex nut for turning the screw bar and apply a torque thereto to increase or decrease the spacing between the opposing pulley saddles. In this manner, the saddles may be brought close together for insertion between two opposing pulleys and then the screw bar may be turned either by hand or with the aid of a wrench where necessary to force the pulleys apart and thereby achieve the proper tension in the belt passing around the pulleys. In a typical automotive vehicle belt and pulley assembly, the tool is inserted with the screw bar extending vertically upward alongside the radiator with the bolt head at the top. In this manner, the tool can be inserted into position and the tool may be adjusted by turning the screw bar by hand or with a wrench engaging the bolt head which is completely outside the belt and pulley assembly area and which is readily accessible.

DETAILED DESCRIPTION

Figure 1:
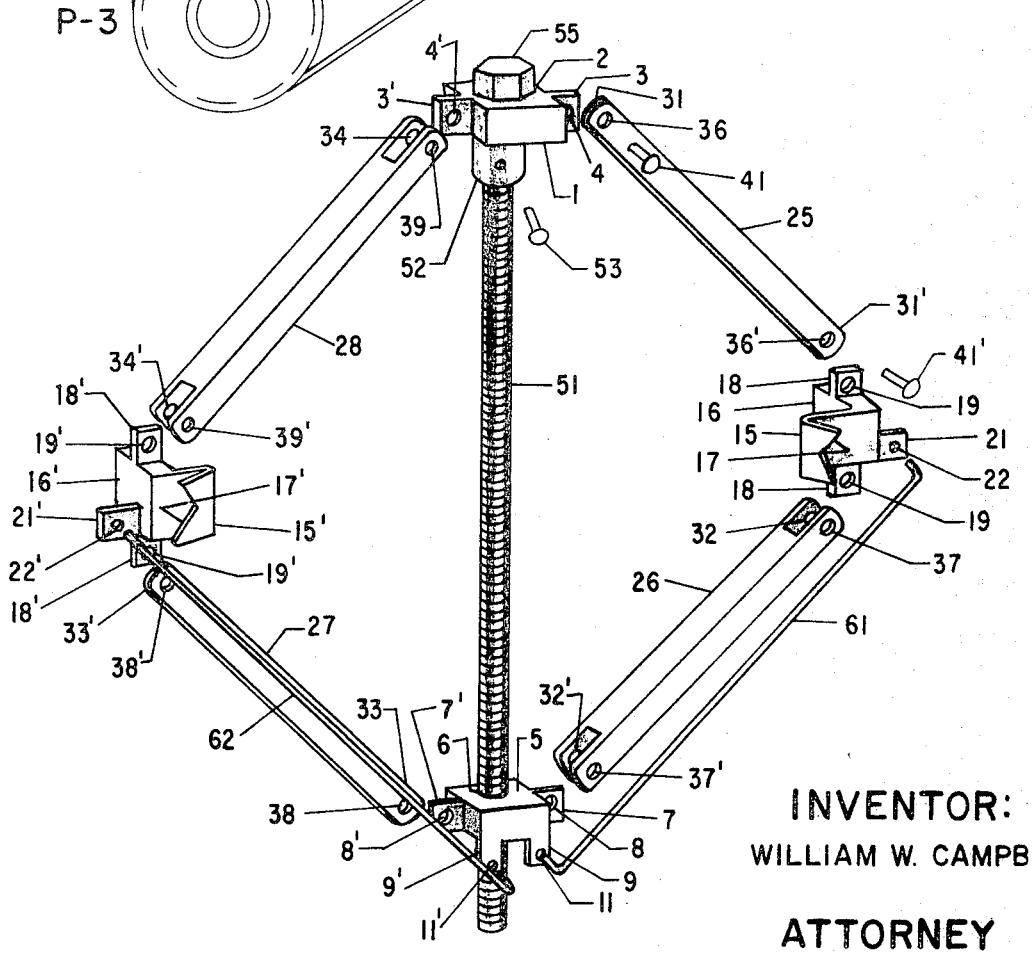
FIG. 1 is an exploded view showing the components of the apparatus of the present invention.

Referring to the FIG. 1 of drawings, the tool T of the present invention is shown in an exploded view with the various components separated to provide a better understanding of their arrangement. The belt tightening tool T in its preferred embodiment consists of a guide block 1, having a smooth bore 2 extending through the face of the block. The guide block 1 is formed from a suitable metal such as cast steel, however, it could be formed from a pair of steel straps welded together and spread apart to form the bore 2. A pair of oppositely disposed flanges 3 and 3' extend from the opposite ends of guide block 1, said flanges have holes 4 and 4' extending therethrough in perpendicular relation to the smooth bore 2. A screw block 5 is positioned opposite the guide block 1. Screw block 5 has a threaded bore 6 extending through its face in alignment with the smooth bore 2. A pair of oppositely disposed flanges 7 and 7' extend from the opposite ends of screw block 5. Flanges 7 and 7' have holes 8 and 8' extending therethrough in perpendicular relation to the threaded bore 6. Screw block 5 also has a pair of projecting tabs 9 and 9' extending from its face on opposite sides of threaded bore 6. The tabs have holes 11 and 11' therethrough.

Figure 2:
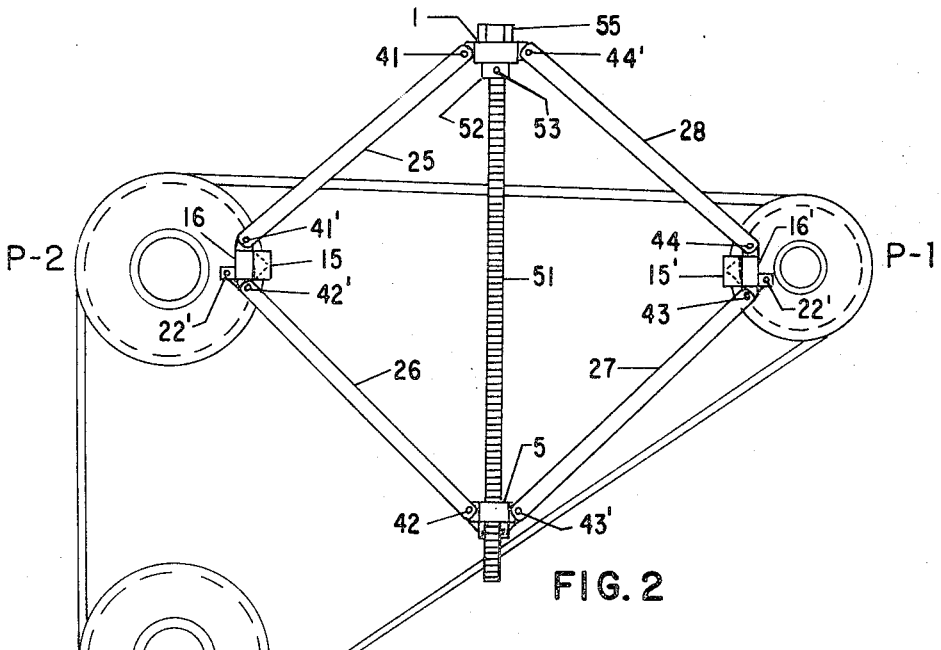
FIG. 2 shows a typical belt and pulley drive assembly with the tool assembled and inserted for use.

A pair of pulley saddles 15 and 15' are positioned opposite to each other and are rigidly connected, one to each of the saddle blocks 16 and 16' and extend outwardly therefrom. The pulley saddles consist of metal plates having a reverse bent portion with V notches 17 and 17' along their edges. The notches 17 and 17' are designed to engage the grooves of opposing pulleys of a belt and pulley assembly as shown in FIG. 2. The saddle blocks 16 and 16' have flanges 18 and 18' extending from each end thereof. The flanges 18 and 18' have holes 19 and 19' therethrough. Tabs 21 and 21' extend from the face of saddle blocks 16 and 16', said tabs having holes 22 and 22' therethrough. Connecting links 25, 26, 27 and 28 are pivotally connected to the saddle blocks 16 and 16' and to the screw block 5 and the guide block 1 in the manner hereinafter described. The connecting links 25, 26, 27 and 28 preferably consist of hollow tubing of rectangular cross section. The links 25, 26, 27 and 28 are identical in size and length with slots designated 31, 31', 32, 32', 33, 33' and 34, 34', respectively cut in each end of the links and with holes 36, 36', 37, 37', 38, 38' and 39, 39' extending through the rods at their ends and in perpendicular relation to the slots. The holes receive suitable fastening means such as rivets 41, 41', 42, 42', 43, 43' and 44, 44' for pivotally connecting the connecting links 25, 26, 27 and 28 to the saddle blocks 16, 16' and to the guide block 1 and the screw block 5, as is shown on the drawing.

A screw bar 51 is threaded over most of its length with screw threads, preferably Acme threads, to provide for faster travel. The screw bar 51 extends through the smooth bore 2 in the guide block 1 and screws into the threaded bore 6 of screw block 5. A bearing collar 52 is mounted around the screw bar 51 and is connected thereto by means of a screw 53. The collar 52 bears against the inside face of the guide block 1. The screw bar 51 has a hex bolt head 55 mounted at its end for turning the screw bar.

A pair of stabilizer rods 61 and 62 are connected at their one ends to the saddle blocks 16 and 16' through the holes 22, 22' in the tabs 21, 21'. The rods 61 and 62 are connected at their other ends to the screw block 5 through the holes 11, 11' in tabs 9, 9'.

The operation of the belt tightening tool T is depicted in FIG. 2. The tool T is inserted into the belt and pulley drive assembly which for purposes of illustration consists of a three pulley assembly of a well-known type wherein pulley P3 is connected to the crankshaft of an engine, P2 is the fan pulley and pulley P1 is adjustably mounted to enable adjustment of the tension in a V-belt B. The tool T is positioned between the pulleys P1 and P2 with the notches 17, 17' on pulley saddles 15, 15' bearing against the grooves of pulleys P and P2. The tool may be inserted and brought snugly into position between the pulleys by turning the hex bolt head 55 by hand. The adjusting bolts (not shown) on the adjustably mounted pulley P1 are loosened. Torque is applied to the bolt head 55 to turn the screw bar 51 to force the pulley saddles 15, 15' against pulleys P1 and P2 thus forcing pulleys P1 and P2 apart to increase the tension in the belt B. A tension gauge G of well-known type may be attached to the belt B for determining the desired tension in belt B. Torque can be applied to bolt head 55 either by hand or with a wrench because the tool is inserted with the screw bar bolt head in an accessible position to the user.

After the proper belt tension has been attained, the tool will hold the belt and pulleys in position at the proper tension without the use of hands until the adjusting bolts on the adjustably mounted pulley are tightened. The screw bar is then turned to loosen and remove the tool from engagement with the pulleys. The tool is constructed with the pulley saddles extending outwardly from the pulley blocks so that the pulley saddles will go between the pulleys and engage the grooves on the pulleys with the remaining components of the tool extending along the faces of the pulleys. Thus, the tool will fit into any belt and pulley drive assembly on an automotive vehicle regardless of the limited space between opposing pulleys or the configuration of belt runs. It is thin in order that it will fit the very limited spaces usually pertaining between the faces of the pulleys and other components such as a radiator.

The stabilizer rods 61 and 62 which are connected at their one end to the respective pulley saddle blocks 16, 16' and at their other end to the screw block 5, act to maintain the pulley blocks in relative parallel alignment with each other thus maintaining the pulley saddles in proper engagement with the pulleys during the tensioning operation.

Having described a preferred embodiment of my invention, what I claim as my invention is:

1. A belt tightening tool for adjusting the tension in the belt of a belt and pulley drive assembly comprising a pair of pulley saddles rigidly connected to respective ones of a pair of saddle blocks, said pulley saddles extending outwardly from said saddle blocks and having a V-notch along their edge for bearing against the groove of oppositely disposed pulleys in a belt and pulley assembly, adjusting means operatively connected to said saddle block for expanding and contracting the interval between said pulley saddles relative to each other along a common axis and for locking said pulley saddles in position relative to each other along said common axis, said adjusting means comprising a screw bar assembly consisting of a screw block having a threaded bore and a guide block having a smooth bore in alignment with said threaded bore and a screw bar having screw threads throughout a substantial portion of its length extending in perpendicular alignment to said common axis through the smooth bore and is threadably engaged in the threaded bore, the screw bar has a bearing collar mounted thereon in bearing contact with one face of the guide block and a bolt head mounted on its end opposite the threaded portion bears against the other face of the guide block, connecting links pivotally connect the guide block and screw block to each of the saddle blocks and stabilizer rods connect each of the saddle blocks to the screw block.

* * * * *